US011140630B2

(12) United States Patent
Lopez et al.

(10) Patent No.: US 11,140,630 B2
(45) Date of Patent: Oct. 5, 2021

(54) WAKE-UP SIGNAL TRANSMISSION

(71) Applicant: Telefonaktiebolaget LM Ericsson (publ), Stockholm (SE)

(72) Inventors: Miguel Lopez, Solna (SE); Leif Wilhelmsson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 110 days.

(21) Appl. No.: 16/476,124

(22) PCT Filed: Jan. 9, 2018

(86) PCT No.: PCT/SE2018/050010
§ 371 (c)(1),
(2) Date: Jul. 5, 2019

(87) PCT Pub. No.: WO2018/139967
PCT Pub. Date: Aug. 2, 2018

(65) Prior Publication Data
US 2019/0357145 A1   Nov. 21, 2019

Related U.S. Application Data

(60) Provisional application No. 62/449,666, filed on Jan. 24, 2017.

(51) Int. Cl.
*H04W 52/24* (2009.01)
*H04W 52/02* (2009.01)
*H04W 52/20* (2009.01)
*H04W 52/54* (2009.01)

(52) U.S. Cl.
CPC ....... *H04W 52/0238* (2013.01); *H04W 52/20* (2013.01); *H04W 52/243* (2013.01); *H04W 52/54* (2013.01)

(58) Field of Classification Search
CPC ............. H04W 52/0238; H04W 52/20; H04W 52/243; H04W 52/54; H04W 52/0209;
(Continued)

(56) References Cited

U.S. PATENT DOCUMENTS 9,485,733 B1* 11/2016 Park ................. H04W 52/0235
9,525,540 B1   12/2016 Shellhammer et al.
(Continued)

FOREIGN PATENT DOCUMENTS

CN        106131800 A      11/2016

OTHER PUBLICATIONS

International Search Report and Written Opinion of the International Searching Authority for International Application No. PCT/SE2018/050010 dated May 25, 2018.
(Continued)

*Primary Examiner* — Kent Krueger
(74) *Attorney, Agent, or Firm* — Sage Patent Group

(57) ABSTRACT

A method is disclosed of a wireless communication node adapted to transmit a wake-up signal for waking up one or more wireless communication receivers.
The method comprises determining a first set of data for concurrent transmission with the wake-up signal, and determining a first interference indicator value indicative of a level of interference caused by the first set of data to the wake-up signal due to concurrent transmission.
The method also comprises deciding if the wake-up signal is to be concurrently transmitted with the first set of data based on the first interference indicator value, and transmitting the wake-up signal in accordance with the decision.
Corresponding arrangement, wireless communication node and computer program product are also disclosed.

18 Claims, 6 Drawing Sheets

(58) Field of Classification Search
CPC ......... H04W 52/0225; H04W 52/0229; H04W 52/0235; H04W 52/0245
See application file for complete search history.

(56) References Cited

U.S. PATENT DOCUMENTS

| | | | |
|---|---|---|---|
| 2008/0144493 | A1 | 6/2008 | Yeh |
| 2014/0050133 | A1* | 2/2014 | Jafarian .............. H04W 74/085 370/311 |
| 2016/0183187 | A1 | 6/2016 | Park |
| 2016/0359608 | A1* | 12/2016 | Noh ...................... H04L 5/1461 |
| 2016/0374020 | A1 | 12/2016 | Azizi et al. |
| 2017/0094600 | A1* | 3/2017 | Min ...................... H04L 5/0007 |
| 2017/0280498 | A1* | 9/2017 | Min ...................... H04L 5/0053 |
| 2018/0176053 | A1* | 6/2018 | Park ................... H04L 27/2613 |
| 2018/0184379 | A1* | 6/2018 | Liu .................. H04W 52/0219 |
| 2019/0159127 | A1* | 5/2019 | Son .................. H04W 52/0219 |

OTHER PUBLICATIONS

Leif Wilhelmsson and Miguel Lopez, "Concurrent transmission of data and a wake-up signal in 802.11ax," doc: IEEE 802.11-17/0094r0, Ericsson, Jan. 2017, 11 pages.

Leif Wilhelmsson and Miguel Lopez, "Efficient Support of WUR in 802.11," Ericsson, 2016, 10 pages.

Karaca et al., "Resource Management for OFDMA based Next Generation 802.11 WLANs," 2016 9th IFIP Wireless and Mobile Networking Conference (WMNC), 2016, 8 pages.

Screen dump from https://wireless.wiki.kernel.org/en/developers/documentation/mac80211/ratecontrol/minstrel, Linus Wireless, Jan. 15, 2018, 8 pages.

Kosunalp et al., "Use of Q-learning approaches for practical medium access control in wireless sensor networks," Engineering Applications of Artificial Intelligence 55, 2016, pp. 146-154.

European Search Report for European Patent Application No. 18744870.9 dated Nov. 20, 2019.

* cited by examiner

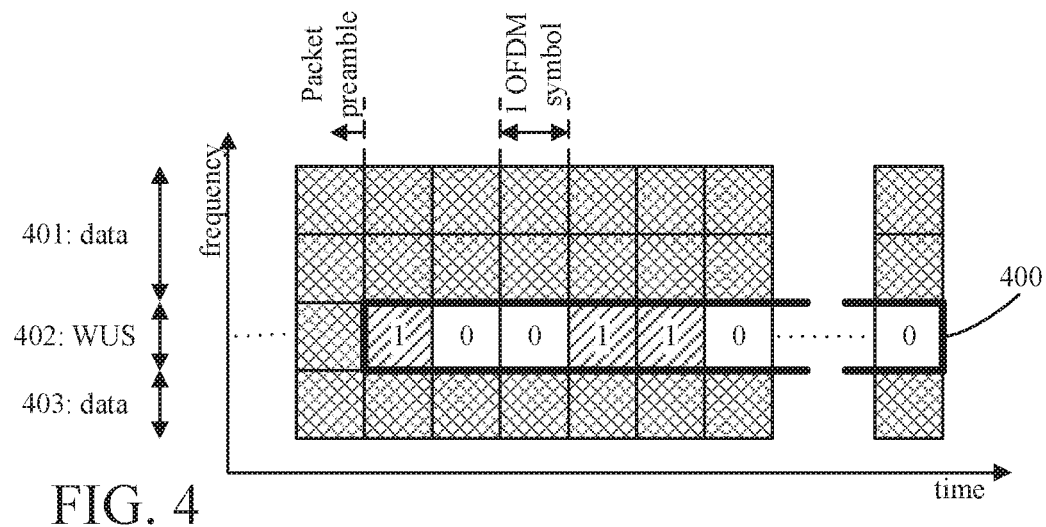
FIG. 4
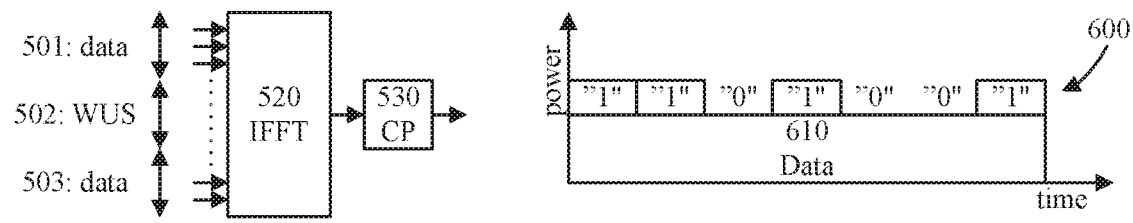
FIG. 5
FIG. 6
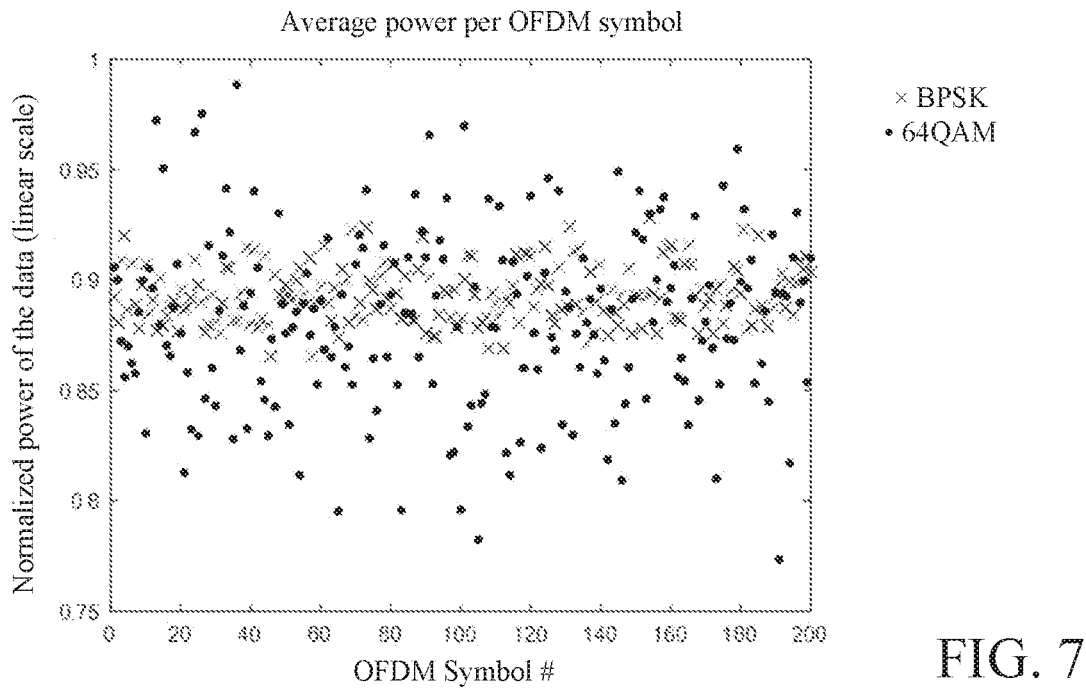
FIG. 7

WAKE-UP SIGNAL TRANSMISSION

CROSS REFERENCE TO RELATED APPLICATIONS

This application is a 35 U.S.C. § 371 national stage application of PCT International Application No. PCT/SE2018/050010 filed on Jan. 9, 2018, which claims the benefit of U.S. Provisional Patent Application Ser. No. 62/449,666, filed on Jan. 24, 2017, the disclosures and content of which are incorporated by reference herein in their entireties.

TECHNICAL FIELD

The present invention relates generally to the field of wireless communication. More particularly, it relates to transmission of wake-up signals (WUS) for reception by a wake-up radio (WUR) for wireless communication receivers.

BACKGROUND

In the following, scenarios where wake-up signals may be subject to transmission will be described.

Internet of Things (IoT) is currently expected to increase the number of connected devices significantly. Many of these devices will likely operate in unlicensed bands (e.g., the 2.4 GHz ISM band). There is also an increased demand for using the unlicensed bands for services that have traditionally been supported in licensed bands. For example, the third generation partnership project (3GPP) that traditionally develops standard specifications for licensed bands have now also developed standard specifications where versions of UMTS-LTE (Universal Mobile Telecommunication Standard, Long Term Evolution) with operation in the 5 GHz unlicensed band. Thus, the unlicensed frequency bands may be expected to accommodate communication in relation to an increasing amount of devices as well as services.

It is often a desire in relation to wireless communication devices to reduce power consumption. The need to reduce power consumption is often particularly pronounced for wireless communication devices in relation to Internet-of-Things (IoT), where the power source may be the device's own energy harvest (e.g. solar) or low energy batteries that are seldom or never charged or replaced, for example.

For many IoT applications, the supported data rates (typically both peak and average values) are low. Thus, a substantial part of the power is consumed not when the IoT device is transmitting or receiving data, but when the device is in a listening mode to determine whether or not there is a signal for which it is the intended receiver. These conditions motivate using wake-up radios (WUR:s). The concept of using a WUR is known in the art as a means to reduce power consumption in wireless communication devices.

A WUR is a circuit, unit or device which has lower power consumption than a main receiver (typically, extremely low power consumption) and whose only purpose is to wake up a main receiver (or transceiver). Hence, a device having a WUR will not need to turn on its main receiver to scan for potential signals (e.g. a data packet) to receive, since the WUR may be used instead. The WUR can detect that there is a signal for the device to receive by detecting a wake-up signature, or wake-up signal (WUS) that is sent in advance of the signal intended for a main receiver of the device. If the WUR determines, based on the WUS, that there is a signal intended for the device, it will wake up the main receiver (and possibly the transmitter) and a communication link can be established for reception of the signal.

One concern with supporting WUR:s is that the transmission of the wake-up signal (WUS) may severely impact the system capacity if the channel is used for the wake-up signal instead of data. This problem was addressed in L. Wilhelmsson and M. Lopez, "Concurrent transmission of data and a wake-up signal in 802.11ax", IEEE doc 802.11-17/0094r0, Jan. 15, 2017 (retrievable from https://mentor.ieee.org/802.11/dcn/17/11-17-0094-00-00ba-concurrent-transmission-of-data-and-a-wake-up-signal-in-802-11ax.pptx) and in M. Lopez and L. Wilhelmsson, "Efficient support of WUR in IEEE 802.11," IEEE Globecom 2016, Washington D.C., USA, December 2016.

Those publications describe techniques to transmit the WUS concurrently with user data by means of multiplexing techniques like OFDM (Orthogonal Frequency Division Multiplexing) and OFDMA (Orthogonal Frequency Division Multiple Access). Such concurrent transmission techniques have some advantages. Since user data is multiplexed with the WUS, the channel (or medium) is more efficiently used and system capacity may be improved. Furthermore, since user data is transmitted with the WUS, potentially interfering devices using some kind of carrier sense multiple access with collision avoidance (CSMA/CA) are more likely to find the channel busy and therefore defer from initiating a transmission. Concurrent transmission also provides a co-existence mechanism with legacy IEEE802.11. The impact of WUS on the performance of the legacy packet can be made negligible (since WUS is typically orthogonal to the payload in the legacy packet). However, the performance of the WUR will decrease for concurrent transmission.

The two references by L. Wilhelmsson and M. Lopez mentioned above notes that, with the introduction of OFDMA in 802.11ax, it is possible to multiplex WUS with data by using one or more resource units (RUs), a form of concurrent transmission of WUS and data using OFDMA. Performance of such an approach is evaluated by simulations when the WUS is generated using OOK and is sent using an (arbitrary) RU. In the simulations, the WUS is assumed not to be longer than the data (thus fitting within data packet). The WUS is generated using IFFT, and will therefore not interfere with the data demodulated using FFT.

When a WUR is to perform WUS detection, the WUS can generally not be filtered out due to that a WUR typically does not comprise means for OFDMA demodulation (the complexity of an FFT would counteract the purpose of the WUR to have extremely low complexity and power consumption). Therefore, the input to the envelope detector of a WUR typically comprises both data and WUS. From the perspective of the WUR, the input signal may be seen as amplitude modulated at the OFDMA symbol rate since one RU is modulated using OOK. In the simulations, the impact of giving the WUS a power boost to improve the performance of the WUR is also investigated. This effect may, for example, be achieved by simply increasing the power of the RU comprising the WUS and/or by allocating more RU:s to the WUS (which is probably preferable due to regulatory restrictions on spectrum flatness).

However, the performance of the WUR in concurrent transmission may still not be satisfactory. Therefore, there is a need for improved methods, arrangement and devices that simultaneously address the performance of the WUR and the system capacity.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It should also be noted that the scenarios described herein (e.g. in relation to IEEE802.11) are merely illustrative examples and are by no means intended as limiting. Contrarily, embodiments may be applicable in any scenario where a transmitter is adapted to transmit both wake-up signals and data.

It is an object of some embodiments to solve or mitigate at least some of the above or other disadvantages.

According to a first aspect, this is achieved by a method of a wireless communication node adapted to transmit a wake-up signal for waking up one or more wireless communication receivers. The method comprises determining (1210) a first set of data for concurrent transmission with the wake-up signal, determining (1220) a first interference indicator value indicative of a level of interference caused by the first set of data to the wake-up signal due to concurrent transmission, deciding (1230) if the wake-up signal is to be concurrently transmitted with the first set of data based on the first interference indicator value, and transmitting (1240, 1260) the wake-up signal in accordance with the decision.

The wireless communication node may be any device adapted to transmit wake-up signals and data. For example, the wireless communication node may be an access point (AP) or a base station.

Concurrent transmission of data and the wake-up signal may, for example, be achieved by using orthogonal frequency division multiplexing (OFDM) where the WUS is allocated one or more resource units (RU), or one or more subcarriers, and is modulated using on-off keying (OOK, which is a special case of amplitude shift keying, ASK). A WUR lacking OFDM demodulation possibilities may typically perceive such an OFDM signal comprising an OOK-modulated WUS as an ASK-modulated WUS subject to noise caused by the data.

According to some embodiments, deciding if the wake-up signal is to be concurrently transmitted with the first set of data based on the first interference indicator value may comprise determining whether the first interference indicator value meets some condition and deciding that the wake-up signal is to be concurrently transmitted with the first set of data if the condition is met.

For example, deciding if the wake-up signal is to be concurrently transmitted with the first set of data based on the interference indicator value may comprise comparing the interference indicator value to a threshold, and deciding that the wake-up signal is to be concurrently transmitted with the first set of data if the interference indicator value falls on a first side of the threshold.

The threshold may be associated with a level of interference where the probability that a WUR is able to correctly detect the WUS is below a minimal acceptable probability value. The interference indicator value falling on a first side of the threshold may correspond to the interference indicator value being lower than the threshold if interference indicator value decreases with a decreased interference level, and may correspond to the interference indicator value being higher than the threshold if interference indicator value increases with a decreased interference level.

The method may further comprise deciding that the wake-up signal is not to be concurrently transmitted with the first set of data if the interference indicator value does not meet the condition (e.g. does not fall on the first side of the threshold).

In some embodiments, if it is not decided that the wake-up signal is to be concurrently transmitted with the first set of data, the method may further comprise determining (1210) a second set of data for concurrent transmission with the wake-up signal.

The second set of data may, for example, be determined such that the level of interference caused by the second set of data to the wake-up signal due to concurrent transmission is lower than the level of interference caused by the first set of data to the wake-up signal due to concurrent transmission. For example, the second set of data may be a smaller set of data to allow allocation of more resource units, or sub-carriers, to the WUS and/or the second set of data may be a set of data using a lower order modulation that does the first set of data.

It may be directly decided to transmit (1240) the wake-up signal concurrently with the second set of data according to some embodiments. Alternatively, the method may further comprise determining (1220) a second interference indicator value indicative of a level of interference caused by the second set of data to the wake-up signal due to concurrent transmission, and deciding (1230) if the wake-up signal is to be concurrently transmitted with the second set of data based on the second interference indicator value.

The process described above (1210, 1220, 1230) may be iterated any suitable number of times according to some embodiments.

When the process described above (1210, 1220, 1230) is not to be iterated any more and, if it is not decided that the wake-up signal is to be concurrently transmitted with any (first, second, etc.) set of data, the method may comprise deciding that the wake-up signal is to be transmitted non-concurrently. Transmitting the wake-up signal non-concurrently may, for example, comprise transmitting the wake-up signal in a separate packet.

According to some embodiments, the level of interference caused by the first (second, etc.) set of data to the wake-up signal due to concurrent transmission is dependent on one of more parameters associated with concurrent transmission. The one or more parameters may comprise at least one of a modulation order of the set of data, a size of an inverse fast Fourier transform applied to the set of data, a number of sub-carriers used by the wake-up signal, and a transmission power ratio between the wake-up signal and the set of data.

In some embodiments, the first (second, etc.) interference indicator value may be determined by calculating an error vector magnitude (EVM) of concurrent transmission of the wake-up signal with the data set.

In some embodiments, the first (second, etc.) interference indicator value may be determined by performing table look-up based on one or more characteristics of concurrent transmission of the wake-up signal with the first (second, etc.) data set to acquire score values corresponding to the one or more characteristics, and accumulating the acquired score values. The one or more characteristics may be equal to or may overlap with at least some of the one of more parameters associated with concurrent transmission, i.e. may comprise at least one of a modulation order of the set of data, a size of an inverse fast Fourier transform applied to the set of data, a number of sub-carriers used by the wake-up signal, and a transmission power ratio between the wake-up signal and the set of data.

A second aspect is a computer program product comprising a computer readable medium (1500), having thereon a computer program comprising program instructions, the computer program being loadable into a data-processing unit (1520) and adapted to cause execution of the method according to the first aspect when the computer program is run by the data-processing unit.

A third aspect is an arrangement for a wireless communication node adapted to transmit a wake-up signal for waking up one or more wireless communication receivers. The arrangement comprises a controller (1400) adapted to cause determination of a first set of data for concurrent transmission with the wake-up signal, determination of a first interference indicator value indicative of a level of interference caused by the first set of data to the wake-up signal due to concurrent transmission, decision of if the wake-up signal is to be concurrently transmitted with the first set of data based on the first interference indicator value, and transmission of the wake-up signal in accordance with the decision.

The controller may, for example, be equivalent to processing means to perform the method according to the first aspect. The processing means may, for example, comprise a processor and a memory.

The controller may be (at least partly) comprised in a resource manager of the wireless communication node. Alternatively, the resource manager may be (at least partly) comprised in the controller. Yet alternatively, the controller may be external to but associated with the resource manager.

The arrangement according to the third aspect may additionally have features identical with or corresponding to any of the various features as explained above for the first aspect.

In some embodiments, the determination of a first (second, etc.) set of data for concurrent transmission with the wake-up signal may be performed by a data set determiner (1420), which may be associated with or comprised in the controller.

In some embodiments, the determination of a first (second, etc.) interference indicator value may be performed by an interference indicator value determiner (1430), which may be associated with or comprised in the controller.

In some embodiments, the decision of if the wake-up signal is to be concurrently transmitted with the first (second, etc.) set of data based on the corresponding interference indicator value may be performed by a decision unit (1440), which may be associated with or comprised in the controller.

In some embodiments, the transmission of the wake-up signal in accordance with the decision may be performed by a transmitter (1410), which may be associated with the controller.

According to some embodiments, the controller may be adapted to cause the decision of if the wake-up signal is to be concurrently transmitted with the first (second, etc.) set of data based on the interference indicator value by causing comparison of the interference indicator value to a threshold, and decision of that the wake-up signal is to be concurrently transmitted with the first (second, etc.) set of data if the interference indicator value falls on a first side of the threshold. The comparison may be performed by a comparator (1441), which may be associated with or comprised in the decision unit.

The controller may, in some embodiments, be adapted to cause determination of the first (second, etc.) interference indicator value by calculation of an error vector magnitude of concurrent transmission of the wake-up signal with the first (second, etc.) data set. The calculation may be performed by an error vector magnitude calculator (1431), which may be associated with or comprised in the interference indicator value determiner.

The controller may, according to some embodiments, be adapted to cause determination of the first (second, etc.) interference indicator value is by performance of table look-up based on one or more characteristics of concurrent transmission of the wake-up signal with the first (second, etc.) data set to acquire score values corresponding to the one or more characteristics, and accumulation of the acquired score values. The characteristics may, for example, be acquired from a resource manager of the wireless communication node. The table look-up may be performed by addressing one or more look-up tables (1432), which may be associated with or comprised in the interference indicator value determiner, using the characteristics. The accumulation may be performed by an accumulator (1433), which may be associated with or comprised in the interference indicator value determiner.

A fourth aspect is an arrangement for a wireless communication node adapted to transmit a wake-up signal for waking up one or more wireless communication receivers. The arrangement comprises a data set determiner (1420) adapted to determine a first set of data for concurrent transmission with the wake-up signal, an interference indicator value determiner (1430) adapted to determine a first interference indicator value indicative of a level of interference caused by the first set of data to the wake-up signal due to concurrent transmission, and a decision unit (1440) adapted to decide if the wake-up signal is to be concurrently transmitted with the first set of data based on the first interference indicator value.

The arrangement is typically associated with a transmitter (1410) adapted to transmit the wake-up signal in accordance with the decision. In some embodiments, the arrangement may comprise the transmitter.

The arrangement according to the fourth aspect may additionally have features identical with or corresponding to any of the various features as explained above for any of the first of third aspects.

A fifth aspect is a wireless communication node comprising the arrangement according to any of the third and fourth aspects.

In some embodiments, any of the above aspects may additionally have features identical with or corresponding to any of the various features as explained above for any of the other aspects.

An advantage of some embodiments is that the system capacity and the performance of the WUR are considered simultaneously. The system capacity is increased compared to a system where WUS is always transmitted separately, while the performance of WUR (e.g. in terms of detection error probability—false alarm and/or missed detection) is improved compared to a system where WUS is always concurrently transmitted with data.

Some embodiments improve the link performance of the WUS for systems where concurrent transmission with data is enabled.

BRIEF DESCRIPTION OF THE DRAWINGS

Further objects, features and advantages will appear from the following detailed description of embodiments, with reference being made to the accompanying drawings, in which:

FIG. 4 is a schematic drawing illustrating an example of concurrent transmission of a wake-up signal and data according to some embodiments;

FIG. 5 is a schematic drawing illustrating an example of signal generation for concurrent transmission of a wake-up signal and data according to some embodiments;

FIG. 6 is a schematic drawing illustrating average power levels for an example of concurrent transmission of a wake-up signal and data according to some embodiments;

FIG. 7 is a simulation plot illustrating example power distributions for data transmission;

DETAILED DESCRIPTION

In the following, embodiments will be described where a wireless communication node is adapted to transmit at least one wake-up signal (WUS) concurrently with data. The wireless communication node is also adapted to transmit wake-up signals non-concurrently. An approach is provided for deciding whether to transmit a wake-up signal concurrently with data or not. Approaches are also provided for a decision regarding which data should be part of the concurrent transmission. Some embodiments may be seen as approaches to enhance resource management at a transmitter when data and WUS may be transmitted concurrently.

In one example, the transmitter has a transmit (TX) buffer with one or more queues containing data for transmission. A resource manager multiplexes users (e.g. via OFDMA) and schedules packets for transmission (e.g. beacons or trigger frames). The transmitter also implements link adaptation for each intended receiver. If the transmitter is an access point (AP), for example, there can be multiple instances of the link adaptation algorithm running in parallel. The link adaptation algorithms determine the modulation and coding to be applied to the data. Some embodiments relate to methods, implemented at the transmitter, that take into account characteristics of the data as determined by the link adaptation and scheduling algorithms in order to determine which data is suitable to transmit concurrently with the WUS. In this way the contamination of the WUS by the data is mitigated, resulting in improved link performance for the WUS (and improved reception performance of the WUR).

The two references by L. Wilhelmsson and M. Lopez mentioned above relate to a WUS design that targets the enhancement of Wi-Fi systems based on the IEEE802.11 standard, where the main transceiver supports an OFDM (or OFDMA) air interface. This example will be used herein for illustrative purposes.

Figure 1:
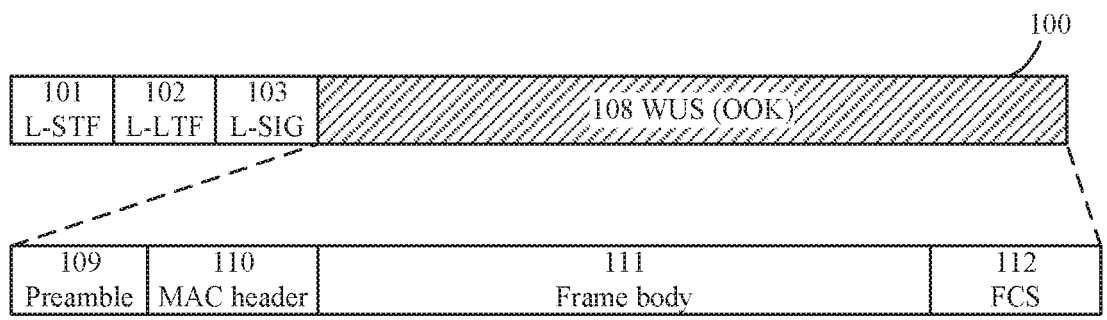
FIG. 1 is a schematic drawing illustrating an example wake-up packet format according to some embodiments.

An example wake-up signal packet format 100 is illustrated in FIG. 1, comprising a legacy IEEE802.11 preamble (providing co-existence with legacy 802.11 STA:s) followed by a WUS waveform 108 based on OOK/OFDM (for non-concurrent transmission and concurrent transmission). The legacy IEEE802.11 preamble may typically comprise a legacy short training field (L-STF) 101, a legacy long training field (L-LTF) 102, and a legacy signal (L-SIG) 103. The WUS waveform 108 may typically comprise a preamble 109, a medium access control (MAC) header 110, a frame body 111 and a frame check sequence (FCS) 112.

Figure 2:
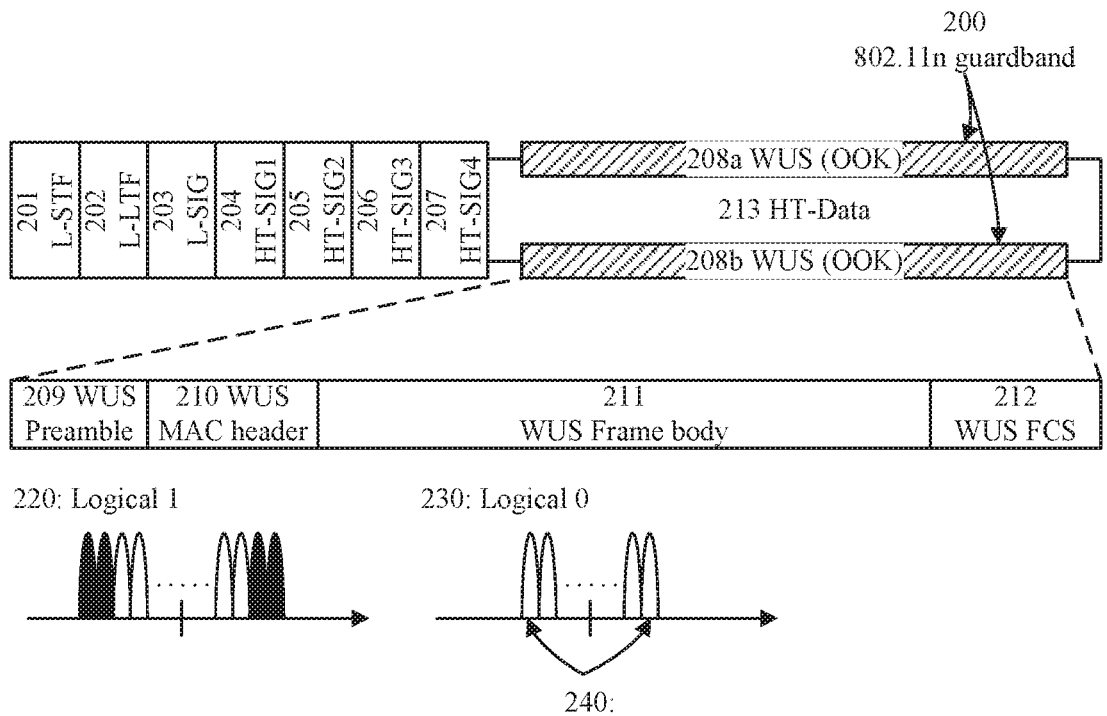
FIG. 2 is a schematic drawing illustrating an example concurrent transmission of a wake-up signal and a legacy packet according to some embodiments.
Figure 3:
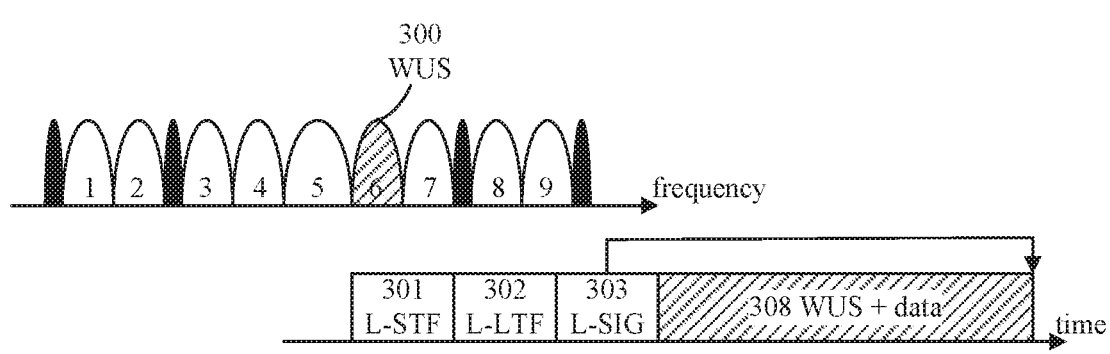
FIG. 3 is a schematic drawing illustrating an example of joint (concurrent) transmission of a wake-up signal and data according to some embodiments.

FIGS. 2, 3 and 4 illustrate examples of transmission of WUS together with a legacy packet by means of ASK/OFDM (concurrent transmission where WUS is using OOK). FIG. 2 illustrates sending WUS using a few guard carriers in IEEE 802.11, FIG. 3 illustrates concurrent transmission of WUS and data using a resource unit (RU6 in the example of FIG. 3) of an OFDM packet, and FIG. 4 illustrates an example location of WUS (400) in the time/frequency grid of an OFDM packet.

In FIG. 2, WUS 208a, 208b is transmitted in a legacy packet comprising a legacy short training field (L-STF) 201, a legacy long training field (L-LTF) 202, a legacy signal (L-SIG) 203, high throughput signal fields (HT-SIG1, HT-SIG2, HT-SIG3, HT-SIG4) 204, 205, 206, 207 and high throughput data (HT-data) 213. In similarity with FIG. 1, the WUS 208a, 208b may typically comprise a WUS preamble 209, a WUS MAC header 210, a WUS frame body 211 and a WUS FCS 212.

In the example illustrated in FIG. 2, WUS is transmitted using OOK in IEEE802.11n guardbands 200, associated with the IEEE802.11n edge of band subcarriers 240. This is manifested in the frequency domain as presence of a signal in the guardbands for a logical 1 and as absence of a signal in the guardbands for a logical 0, as illustrated at 220 and 230, respectively.

In FIG. 3, example WUS transmission is illustrated in frequency domain and in time domain. In the frequency domain a WUS 300 is transmitted in a certain frequency interval 6 (which may correspond to the IEEE802.11n subcarriers of FIG. 2, including guardbands) selected from a collection of frequency intervals 1, 2, 3, 4, 5, 6, 7, 8, 9 as specified in IEEE802.11. In the time domain, the WUS packet may be seen to comprise a legacy short training field (L-STF) 301, a legacy long training field (L-LTF) 302, a legacy signal (L-SIG) 303, and a field 308 comprising the WUS+data (compare with FIG. 2).

In FIG. 4, example WUS transmission is illustrated in a time/frequency grid. In the frequency domain a WUS 400 is transmitted in a certain frequency interval 402 and data is transmitted in the neighboring frequency intervals 401, 403. The WUS 400 comprises a number of OFDM symbols and is preceded by a packet preamble. Each OFDM symbol for the WUS represents either a "1" (implemented as presence of a signal) or a "0" (implemented as absence of any signal). In the example situation where the main transceiver supports an OFDM (or OFDMA) air interface, both the WUS 502 and the data 501, 503 may be generated concurrently using an inverse fast Fourier transform (IFFT) 520, see FIG. 5 (illustration of an example of how the WUS may be generated together with the data signal using an IFFT, and appending of a cyclic prefix (CP) 530). When the composite signal is generated as depicted in FIG. 5, the symbol rate of the WUS will be the same as symbol rate of the OFDM system used for the data.

As mentioned above, the WUS may be implemented using On-Off keying (OOK). This may be achieved by letting a logical zero be generated by blanking the subcarriers allocated to the WUS during the whole duration of one OFDM symbol (including the cyclic prefix), and by letting a logical one be generated by transmitting arbitrary constellation symbols (e.g. QAM symbols) having a predetermined power during the duration of one OFDM symbol (including the cyclic prefix).

FIGS. 4 and 5 illustrate the generation of WUS in an OFDM/OFDMA system by means of an IFFT, where data and WUS are transmitted concurrently. In the example of FIG. 4, 3 RU:s 401, 403 are allocated to data and one RU 402 is allocated to the WUS. The WUS 400 is enclosed by a thick black line for illustration purposes. A logical zero is generated by blanking the subcarriers allocated to the WUS for the duration of one OFDM symbol. A logical one is generated by transmitting arbitrary constellation symbols in the subcarriers allocated to the WUS for the duration of one OFDM symbol.

To provide a numerical example, suppose that the OFDM system would use the same parameters used in IEEE802.11n and IEEE802.11ac. Then, for a 20 MHz channel, the sampling rate would be 20 MHz and a 64 point FFT (fast Fourier transform) would be employed. This means that the duration of one OFDM symbol without the cyclic prefix (CP) becomes $64/(20 \cdot 10^6)=3.2$ µs. The most commonly used length of the cyclic prefix is 800 ns, so the total duration for an OFDM symbol including the CP becomes 4 µs in this example. The symbol rate for the WUS would consequently be 250 kb/s.

In another example, the wireless OFDMA system uses the same parameters as specified in the IEEE802.11ax standard draft. Then for a 20 MHz channel, the sampling rate would be 20 MHz and a 256 point FFT would be employed. This means that the duration of one OFDM symbol without the CP becomes $256/(20 \cdot 10^6)=12.8$ µs. Using a cyclic prefix (CP) of 800 ns, the total duration for an OFDM symbol including the CP becomes 13.6 µs. The symbol rate for the WUS would consequently be 73.5 kb/s.

FIG. 6 provides a schematic illustration of an example of how the total power 600 in a packet may vary as a function of the information in the WUS when WUS and data are concurrently transmitted. The power level 610 of the data shown in FIG. 6 represents an average power over the whole packet. FIG. 6 shows that concurrent transmission of WUS (using OOK) and data results in the WUS modulating the amplitude of the signal. Hence, when considering the packet containing both data and WUS, the WUS can be seen as employing Amplitude Shift Keying (ASK).

Methods and mechanisms for WUS generation and concurrent transmission of WUS and data have now been described. It is noted that concurrent transmission may result in efficient utilization of the medium and may provide some protection against interfering stations (STA:s). The data and the WUS in concurrent transmission may be made orthogonal in the sense that they may be generated using orthogonal subcarriers in OFDM/OFDMA, which implies that the WUS does not cause interference to the data.

However, the data interferes with the WUS even if it is generated using an OFDM/OFDMA transmitter. This is because the WUS may be seen as based on ASK and is demodulated by, for example, an envelope detector rather than by using an FFT. This interference cannot be understood from FIG. 6, where the average power of the data was depicted. The reason for the interference by the data to the WUS is that the instantaneous power of the data exhibits significant variations. These variations are typically such that, even after averaging over one (or more) OFDM symbol, there will be significant power fluctuations. These (average) power fluctuations of the data result in contamination (interference) of the WUS.

Figure 8:
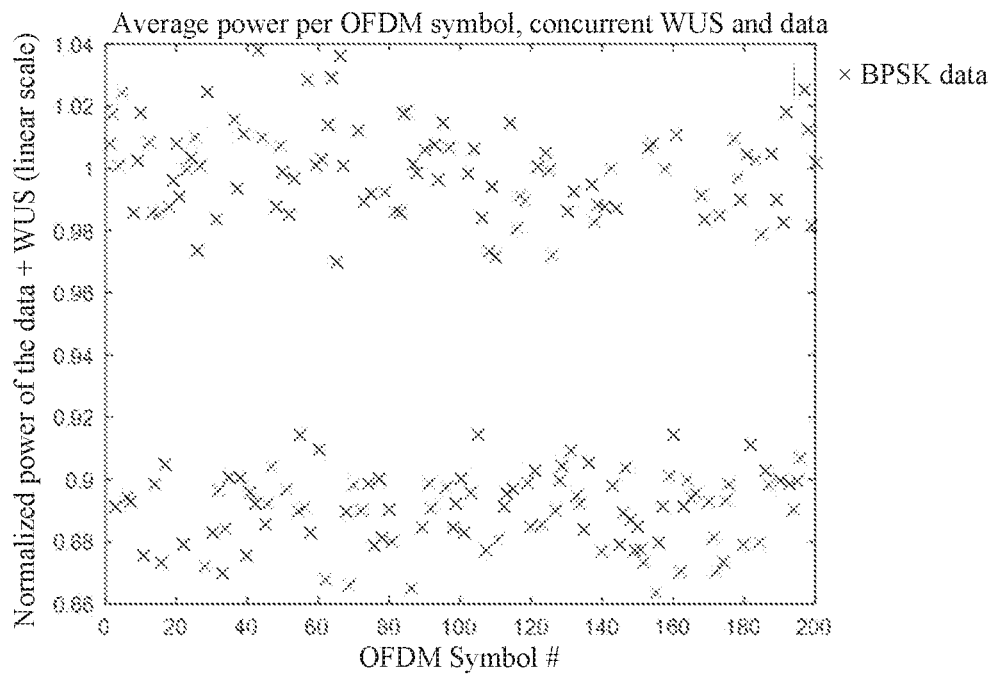
FIG. 8 is a simulation plot illustrating example power distributions for concurrent transmission of data and wake-up signal according to some embodiments.
Figure 9:
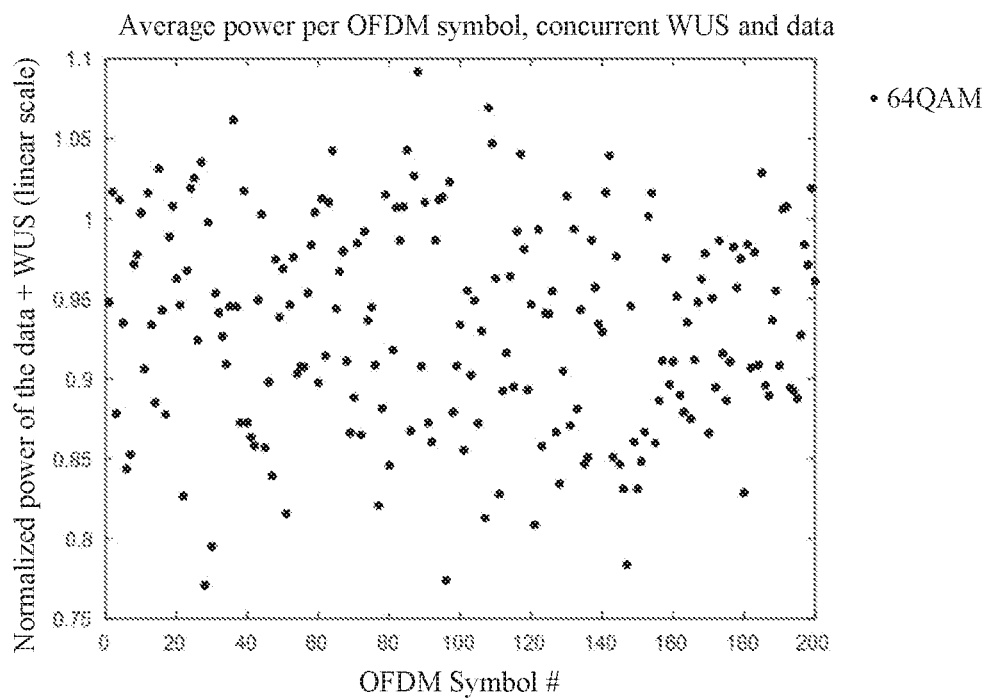
FIG. 9 is a simulation plot illustrating example power distributions for concurrent transmission of data and wake-up signal according to some embodiments.

To understand better this problem, note that FIG. 6 depicts only two power levels, which is an ideal situation. FIGS. 7, 8 and 9 illustrate more realistic scenarios.

FIG. 7 shows, for two different modulation orders, the variations of the power of the data for an 802.11ax packet (with 200 OFDM symbols) where 8 RU:s have been allocated to data and 1 RU has been allocated to WUS. Each point represents the average power calculated over one OFDM symbol. The power of the WUS is not included in the power calculations for FIG. 7 (i.e. the power variations depend only on the data, the 1 RU allocated to the WUS has been left empty). It can be seen that the average power per OFDM symbol fluctuates, and that the fluctuations depend on the modulation order. High order modulations (like 64-QAM) give larger power fluctuations than low order modulations (like BPSK).

FIG. 8 illustrates, for BPSK data modulation the average power per OI-DM symbol, for an 802.11ax packet (with 200 OFDM symbols) carrying data and a WUS. 1 RU has been allocated to the WUS and 8 RU:s to the data. As in FIG. 7, each point represents the average power calculated over one OFDM symbol. Unlike the ideal situation shown in FIG. 6, the two power levels (ASK), although clearly distinct, are noisy.

FIG. 9 illustrates, for 64QAM data modulation the average power per OFDM symbol, for an 802.11ax packet (with 200 OFDM symbols) carrying data and a WUS. 1 RU has been allocated to the WUS and 8 RU:s to the data. As in FIG. 7, each point represents the average power calculated over one OFDM symbol. Unlike the ideal situation shown in FIG. 6, the two power levels (ASK) are very noisy.

Comparing FIG. 9 to FIG. 8 it is clear that the modulation order plays an important role when using ASK. In particular, using high order modulations for the data introduces more noise for the ASK signal than using low order modulations for the data.

Thus, the problem of interference caused by data on the WUS may be illustrated by means of the impact of the modulation order of the data. Alternatively or additionally, there may be other factors that influence the interference by data to the WUS. Some examples of such factors include the IFFT/FFT size and the number of RU:s (or sub-carriers) allocated to the WUS.

Thus, one problem with earlier methods for WUS generation and concurrent transmission of WUS and data is that they do not overcome the problem of contamination (interference) by the data of the WUS, as exemplified in FIGS. 8 and 9. Hence, link performance for the WUS is inferior for such approaches. One concern with WUR design is that power savings typically come at the expense of sensitivity. Hence, improving link performance of the WUS is important.

Figure 10:
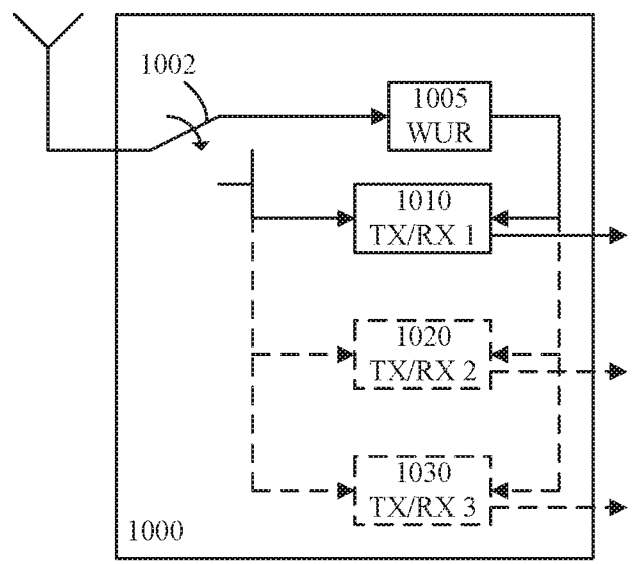
FIG. 10 is a schematic block diagram illustrating an example arrangement for a wireless communication receiver comprising a wake-up radio according to some embodiments.

FIG. 10 illustrates an example wake-up radio architecture 1000 for a wireless communication device. The architecture comprises one or more main transceivers (TX/RX 1, 2, 3) 1010, 1020, 1030, each corresponding to, e.g., a respective reception/transmission standard. In this example, all of the one or more main transceivers are associated with a same wake-up radio unit (WUR) 1005.

Starting in an idle mode, the switch 1002 will be in the location indicated in FIG. 10, conveying the antenna signal to the wake-up radio unit 1005, while the main transceivers are in respective sleep modes. The wake-up radio unit 1005 monitors the WUS for each of the one or more main transceivers, and when the wake-up radio unit detects a relevant WUS it wakes up the corresponding transceiver and causes the switch 1002 to shift position so that the antenna signal is conveyed to the main transceiver instead of the wake-up radio unit. Then the woken-up main transceiver communicates as standardized until it enters sleep mode again and causes the switch 1002 to shift position to the location indicated in FIG. 10.

In the example shown in FIG. 10, the same antenna is used for the WUR and the one or more different main transceivers, and a switch is used to illustrate whether or not only the WUR is active. This is merely illustrative to emphasize that only the WUR is active until the WUS has been detected, after which one or more of the main transceivers become active. It is to be understood that embodiments are not restricted to the use of a single common antenna, but may also be applicable when, for example, all (or some of) the main transceivers have different antennas (e.g. due to operation in different frequency bands) and/or when a WUR has a separate antenna. The WUR having a separate antenna may, for example, be applicable if the WUS is sent using a frequency which differs (possibly substantially) from the frequencies used by any of the main transceivers for any of the standards supported by the device.

Figure 11:
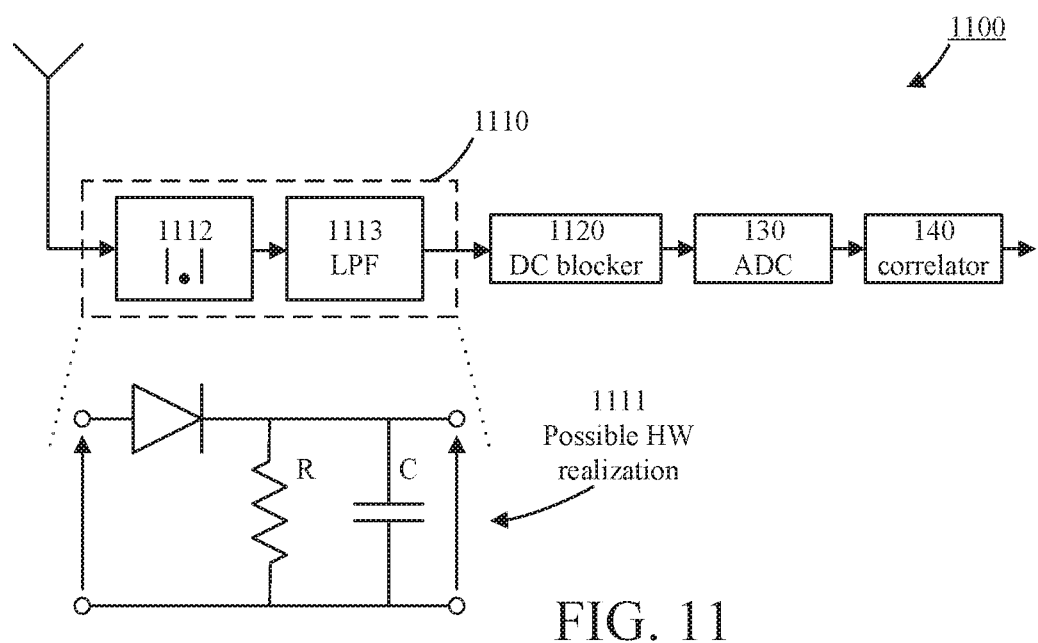
FIG. 11 is a schematic block diagram illustrating an example wake-up radio according to some embodiments.

FIG. 11 illustrate an example implementation of a wake-up radio (WUR) receiver chain 1100. The WUR implementation is typically characterized by low power consumption (and possibly low cost and/or low complexity). This example receiver chain comprises an envelope detector 1110 (e.g., comprising a rectifier and a low pass filter), a DC blocker, an analog-to-digital converter, and a correlator. A WUS may be considered to be detected when a distinct peak (e.g. above a detection threshold) is present at the correlator output. The same WUR receiver chain 1100 can be employed for a basic (non-concurrent) packet format (OOK) and a modified (concurrent) packet format (ASK). Hence, there is no need for WUR to know which of the formats is used.

Figure 12:
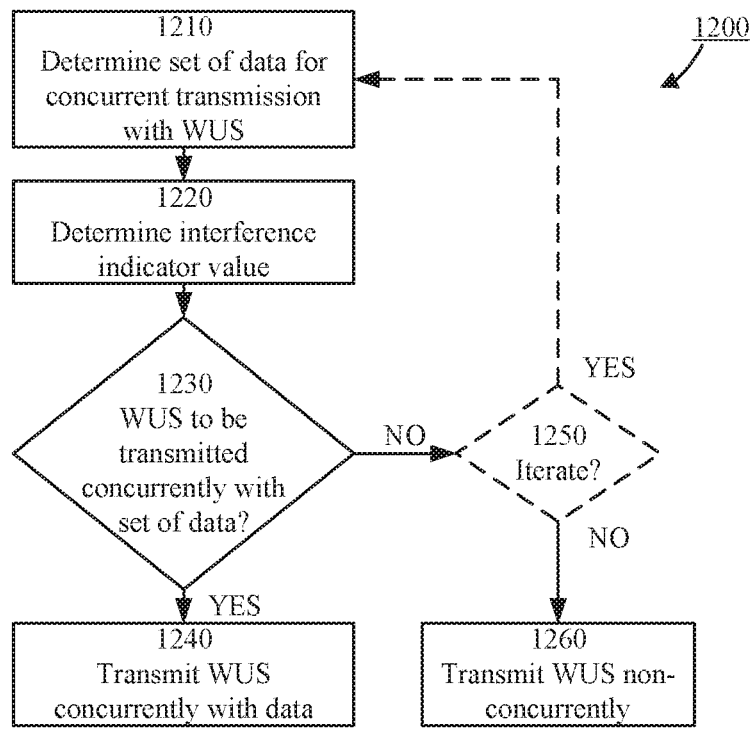
FIG. 12 is a flowchart illustrating example method steps according to some embodiments.

FIG. 12 illustrates an example method 1200 according to some embodiments. The method 1200 may be performed by a wireless communication node adapted to transmit a wake-up signal for waking up one or more wireless communication receivers. The wireless communication node may be adapted to transmit the wake-up signal either concurrently with data or non-concurrently (in a transmission without data, which may or may not comprise more than one WUS).

The method may start in 1210 where a (first) set of data for concurrent transmission with the wake-up signal is determined. This determination may, for example, be random or may be based on some suitable criteria applied by a resource manager.

In step 1220 a (first) interference indicator value is determined based on the (first) set of data. The (first) interference indicator value is indicative of a level of interference caused by the (first) set of data to the wake-up signal due to concurrent transmission.

As mentioned before, the level of interference caused by the data to the wake-up signal due to concurrent transmission may be dependent on one of more parameters, or factors, associated with concurrent transmission (e.g., the modulation order of the data, the size of the IFFT/FFT, the number of resource units (or sub-carriers) allocated to the wake-up signal, transmission power ratio between the wake-up signal and the data, etc.). The possible impact of the modulation order was explained and exemplified above. The FFT (or, equivalently, the IFFT) size may also have significant impact since increasing the number of sub-carriers (FFT size) typically leads to decreased fluctuations of the average power over one OFDM symbol. Furthermore, a relatively large FFT size typically entails a relatively low the data rate of the WUS, and thereby the filter used for extracting the WUS can be made narrower. Regarding the number of allocated RU:s (or sub-carriers), the impact of the contamination by the data on the WUS may be decreased by increasing the number of RU:s (or sub-carriers) allocated to the WUS.

The interference indicator value may be determined by calculating an error vector magnitude (EVM) of concurrent transmission of the wake-up signal with the data set. Alternatively or additionally, the interference indicator value may be determined by performing table look-up based on one or more characteristics (e.g., the parameters above) of concurrent transmission to acquire score values corresponding to each of the one or more characteristics, and accumulating the acquired score values.

In step 1230, the (first) interference indicator value is used to decide if the wake-up signal is to be concurrently transmitted with the (first) set of data. The decision of step 1230, whether or not the wake-up signal is to be concurrently transmitted with the set of data under consideration, may comprise determining whether the interference indicator value meets some condition and deciding that the wake-up signal is to be concurrently transmitted if the condition is met.

For example, the decision may comprise comparing the interference indicator value to a threshold, and deciding that the wake-up signal is to be concurrently transmitted if the interference indicator value falls on a first side of the threshold. The threshold may, for example, be associated with a level of interference where the probability that a WUR is able to correctly detect the WUS is below a minimal acceptable probability value. The interference indicator value falling on a first side of the threshold may correspond to the interference indicator value being lower than the threshold if the interference indicator value decreases with a decreased interference level, and may correspond to the interference indicator value being higher than the threshold if the interference indicator value increases with a decreased interference level.

If it is determined that the wake-up signal is to be concurrently transmitted with the (first) set of data (YES-path out of step 1230), the wake-up signal is concurrently transmitted with the (first) set of data in step 1240.

If it is determined that the wake-up signal is not to be concurrently transmitted with the (first) set of data (NO-path out of step 1230), the wake-up signal may (depending on implementation) either be transmitted non-concurrently in step 1260 or the process may return to step 1210 as illustrated by optional step 1250.

If the process returns to step 1210, a second set of data for concurrent transmission with the wake-up signal is determined there and the method is repeated for the second set of data. Alternatively, after having determined the second set of data in step 1210, the process may continue directly to step 1240 (path not shown in FIG. 12), where the wake-up signal is concurrently transmitted with the second set of data.

The second set of data may, for example, be determined such that the level of interference caused by the second set of data to the wake-up signal due to concurrent transmission is lower than the level of interference caused by the first set of data. For example, the second set of data may be a smaller set of data to allow allocation of more resource units, or sub-carriers, to the WUS and/or the second set of data may be a set of data using a lower order modulation that does the first set of data.

The iteration of steps 1210, 1220, 1230 and 1250 in case it is determined that the wake-up signal is not to be concurrently transmitted with the set of data under consideration may be performed any suitable number of times. Consideration of only two (first and second) sets of data may be suitable in some embodiments.

Eventually, the wake-up signal is transmitted in accordance with the decision(s), either non-concurrently in step 1260 or concurrently with the set of data under consideration in step 1240.

The impact of the contamination by the data on the WUS may be quantified in several ways, two of which have been exemplified above in connection to the description of step 1220; determination of the interference indicator value.

For example, it is possible to calculate the Error Vector Magnitude (EVM) of the ASK signal by comparing the actual ASK signal generated by the transmitter (see e.g. FIGS. 8 and 9) to an ideal signal that is generated assuming that the data has constant envelope. The RMS (root mean square) of the difference between the two signals defines the EVM of the ASK signal. Such a measure may, for example, be used as the interference indicator value in the method 1200.

Another example way to determine a measure that may be used as the interference indicator value in the method 1200 is using a scoring system. An advantage of such an approach is that it requires no (or a very small amount) of calculations.

Tables 1, 2 and 3 represent non-limiting examples of scores (quantification of impact of contamination of WUS by the data) that may be used (alone or in any combination) in this approach. According to the examples of Tables 1-3, a high scoring value represents a high level of interference by data to the WUS, and should preferably be avoided. Thus, if a selection of parameters is possible (e.g. in connection with the determination of step 1210) it may be considered preferable from an interference point of view to choose a combination of parameters that gives a low combined impact (accumulated score). In various embodiments, only one, or two, or all three of the parameters in Tables 1-3 may be considered. For example, an accumulated score may be determined based on the modulation order (Table 1) only.

Tables 1-3 and/or other suitable score tables may, for example, be implemented in the form of look-up tables.

TABLE 1

Example score values based on the highest order of modulation (largest symbol constellation) used for the data.

| Order of modulation | Impact of contamination on WUS (score) |
| --- | --- |
| 1 (BPSK) | 1 |
| 2 (QPSK) | 2 |
| 4 (16-QAM) | 3 |
| 6 (64-QAM) | 4 |
| 8 (256-QAM) | 5 |

TABLE 2

Example score values based on the FFT size used to modulate the data.

| FFT size | Impact of contamination on WUS (score) |
| --- | --- |
| 64 (e.g. 802.11n) | 1 |
| 256 (e.g. 802.11ax) | 2 |

TABLE 3

Example score values based on the number of RU:s allocated to WUS (e.g., in an 802.11ax packet)

| Number of RU:s | Impact of contamination on WUS (score) |
| --- | --- |
| 1 | 8 |
| 2 | 7 |
| 3 | 6 |
| 4 | 5 |
| 5 | 4 |
| 6 | 3 |
| 7 | 2 |
| 8 | 1 |
| 9 | 0 |

In an example where some embodiments may be applicable, the transmitter keeps one or more queues containing data for transmission, and a resource manager multiplexes users (e.g. using OFDMA) and schedules packets for transmission (e.g. beacons, trigger frames, etc.). The transmitter also implements link adaptation (determining modulation and coding to be applied to the data) for each intended receiver, and when the transmitter is an access point (AP) there may be multiple instances of the link adaptation algorithm running in parallel. Examples of resource managers may be found, e.g., in M. Karaca et al. "Resource management for O1-DMA based next generation 802.11 WLANs", 9th IFIP Wireless and Mobile Networking Conference 2016, available from http://ieeexplore.ieee.org/stamp/stamp.jsp?arnumber=7543930). A widely used link adaptation algorithm is Minstrel, overview available from https://wireless.wiki.kernetorg/en/developers/documentation/mac80211/ratecontrol/minstrel.

In some embodiments, the resource manager in the transmitter determines the impact of the data on the WUS; the interference indicator value (compare with step 1210). As discussed above, the impact may, for example, be quantified in terms of the EVM or by scoring using table look-up. The data and WUS are transmitted concurrently (compare with step 1240) only when the impact fulfill some condition (compare with step 1230), e.g., does not exceed a predefined threshold. Otherwise, the WUS may be transmitted in a separate packet (compare with step 1260); e.g. a packet consisting only of WUS. According to some embodiments, more than one data set may be considered for concurrent transmission before transmitting WUS in a separate packet.

In some embodiments, the consideration of the impact of the data on the WUS (the interference indicator value) is incorporated directly into the resource management algorithms. For example, the scheduler may not allow allocation of a WUS to any RU:s in a multi-user packet whenever the impact of the data allocated to the other RU:s in the multi-user packet exceeds a predefined threshold. The transmitter may try to find another resource allocation that reduces the impact, for example, by considering allocation of more RU:s to the WUS and/or by fetching data (from a different queue) that needs a lower order of modulation than that previously considered.

Figure 13:
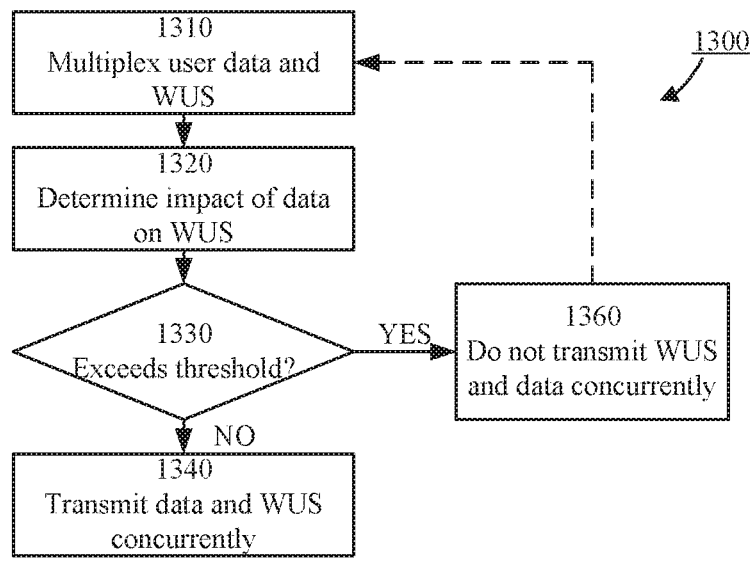
FIG. 13 is a flowchart illustrating example method steps according to some embodiments.

FIG. 13 illustrates an example method 1300 for concurrent transmission of data and WUS according to some embodiments. Step 1310 may be seen as having analogies with step 1210, step 1320 may be seen as having analogies with step 1220, step 1330 may be seen as having analogies with step 1230, step 1340 may be seen as having analogies with step 1240, and step 1360 may be seen as having analogies with steps 1260 and 1250. The dashed line may be seen as having analogies with (or corresponding to) an embodiment where the consideration of the impact of the data on the WUS is incorporated directly into the resource management algorithms.

Figure 14:
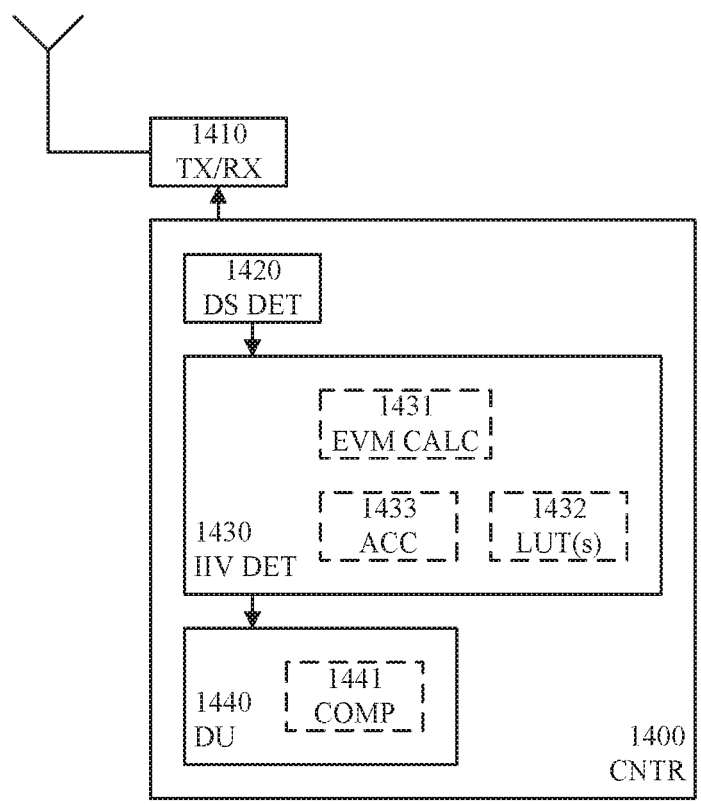
FIG. 14 is a schematic block diagram illustrating an example arrangement for a wireless communication node adapted to transmit a wake-up signal according to some embodiments.

FIG. 14 schematically illustrates an example implementation of an arrangement for a wireless communication node adapted to transmit a wake-up signal for waking up one or more wireless communication receivers. The arrangement comprises a controller (CNTR) 1400 and a transceiver (TX/RX) 1410. Alternatively or additionally, the arrangement may also comprise a data set determiner (DS DET) 1420, an interference indicator value determiner (IIV DET) 1430, and a decision unit (DU) 1440. The interference indicator value determiner 1430 may comprise an error vector magnitude calculator (EVM CALL) 1431, and/or an accumulator (ACC) 1433 and/or one or more look-up tables (LUT(s)) 1432. The arrangement of FIG. 14 may be adapted to perform methods described herein, for example any of the methods of FIGS. 12 and 13. Further operations of the arrangement of FIG. 14 may be understood by referring to the description of the third and fourth aspects in the summary section.

According to some embodiments, a method is provided as follows:
1. A method in a wireless node for concurrent transmission of data and WUS, where the WUS is transmitted using ASK, the method comprising:
   a. multiplexing first data together with WUS, where multiplexing comprises allocation of radio resources and link adaptation;
   b. obtaining information from a resource manager regarding characteristics of the first data, where said information comprises one or more of:
      i. Modulation order
      ii. FFT size
      iii. Number of subcarriers or RU:s allocated to the WUS
   c. determining, based on the information from 1a, the impact of the contamination of the WUS by the data;
   d. deciding, based on the information from 1b, whether to allow concurrent transmission of WUS and first data, wherein concurrent transmission of WUS and first data is not allowed whenever the impact determined in 1c exceeds a predefined threshold;
   e. transmitting:
      i. first data and WUS concurrently when concurrent transmission of first data and WUS is allowed in 1d;
      ii. WUS in a separate packet when concurrent transmission of first data and WUS is not allowed in 1d.
2. As in 1, where the impact of the contamination of the WUS by first data is determined as the EVM of the ASK signal
3. As in 1, where the impact of the contamination of the WUS by first data is determined by table look-up, and where the tables quantify the impact as a function of any of the information obtained in 1b.
4. As in 1-3, where second data is multiplexed together with WUS (instead of the first data) whenever it is decided in 1d to not allow concurrent transmission of the first data and WUS.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication node, an access point, a network node, or the like) comprising arrangements/circuitry/logic or performing methods according to any of the embodiments.

Figure 15:
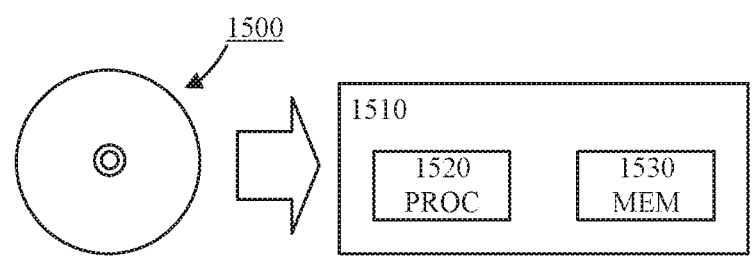
FIG. 15 is a schematic drawing illustrating a computer readable medium according to some embodiments.

According to some embodiments, a computer program product comprises a computer readable medium such as, for example, a USB-stick, a plug-in card, an embedded drive, or a read-only memory (ROM) such as the CD-ROM 1500 illustrated in FIG. 15. The computer readable medium may have stored thereon a computer program comprising program instructions. The computer program may be loadable into a data-processing unit (PROC) 1520, which may, for example, be comprised in a wireless communication node 1510. When loaded into the data-processing unit, the computer program may be stored in a memory (MEM) 1530 associated with or integral to the data-processing unit. According to some embodiments, the computer program may, when loaded into and run by the data-processing unit, cause execution of method steps according to, for example, the methods shown in any of the FIGS. 12 and 13.

Reference has been made herein to various embodiments. However, a person skilled in the art would recognize numerous variations to the described embodiments that would still fall within the scope of the embodiments. For example, the method embodiments described herein describes example methods through method steps being performed in a certain order. However, it is recognized that these sequences of events may take place in another order without departing from the scope of the embodiments. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the embodiments.

Hence, it should be understood that the details of the described embodiments are merely for illustrative purpose and by no means limiting. Instead, all variations that fall within the range of the embodiments are intended to be embraced therein.

The invention claimed is:
1. A method of a wireless communication node adapted to transmit a wake-up signal for waking up one or more wireless communication receivers, the method comprising:
    determining a first set of data for concurrent transmission with the wake-up signal;

determining a first interference indicator value indicative of a level of interference caused by the first set of data to the wake-up signal due to concurrent transmission;

deciding if the wake-up signal is to be concurrently transmitted with the first set of data based on the first interference indicator value; and transmitting the wake-up signal in accordance with the decision.

2. The method of claim 1, wherein deciding if the wake-up signal is to be concurrently transmitted with the first set of data based on the interference indicator value comprises:

comparing the interference indicator value to a threshold; and deciding that the wake-up signal is to be concurrently transmitted with the first set of data if the interference indicator value falls on a first side of the threshold.

3. The method of claim 1, further comprising, if it is not decided that the wake-up signal is to be concurrently transmitted with the first set of data, determining a second set of data for concurrent transmission with the wake-up signal.

4. The method of claim 3, further comprising:

determining a second interference indicator value indicative of a level of interference caused by the second set of data to the wake-up signal due to concurrent transmission; and deciding if the wake-up signal is to be concurrently transmitted with the second set of data based on the second interference indicator value.

5. The method of claim 1, wherein, if it is not decided that the wake-up signal is to be concurrently transmitted with any set of data, deciding that the wake-up signal is to be transmitted non-concurrently.

6. The method of claim 1, wherein the level of interference caused by the first set of data to the wake-up signal due to concurrent transmission is dependent on one of more parameters associated with concurrent transmission, said one or more parameters comprising at least one of:

a modulation order of the first set of data, a size of an inverse fast Fourier transform applied to the first set of data, a number of sub-carriers used by the wake-up signal, and a transmission power ratio between the wake-up signal and the first set of data.

7. The method of claim 1, wherein the first interference indicator value is determined by calculating an error vector magnitude of concurrent transmission of the wake-up signal with the first data set.

8. The method of claim 1, wherein the first interference indicator value is determined by:

performing table look-up based on one or more characteristics of concurrent transmission of the wake-up signal with the first data set to acquire score values corresponding to the one or more characteristics; and accumulating the acquired score values.

9. A computer program product comprising a computer readable medium storing a computer program comprising program instructions, the computer program being executed by at least on processor to perform the method according to claim 1.

10. An arrangement for a wireless communication node adapted to transmit a wake-up signal for waking up one or more wireless communication receivers, the arrangement comprising a controller adapted to cause:

determination of a first set of data for concurrent transmission with the wake-up signal;

determination of a first interference indicator value indicative of a level of interference caused by the first set of data to the wake-up signal due to concurrent transmission;

decision of if the wake-up signal is to be concurrently transmitted with the first set of data based on the first interference indicator value; and transmission of the wake-up signal in accordance with the decision.

11. The arrangement of claim 10, wherein the controller is adapted to cause the decision of if the wake-up signal is to be concurrently transmitted with the first set of data based on the interference indicator value by causing:

comparison of the interference indicator value to a threshold; and decision of that the wake-up signal is to be concurrently transmitted with the first set of data if the interference indicator value falls on a first side of the threshold.

12. The arrangement of claim 10, wherein the controller is further adapted to cause, if it is not decided that the wake-up signal is to be concurrently transmitted with the first set of data, determination of a second set of data for concurrent transmission with the wake-up signal.

13. The arrangement of claim 12, wherein the controller is further adapted to cause:

determination of a second interference indicator value indicative of a level of interference caused by the second set of data to the wake-up signal due to concurrent transmission; and decision of if the wake-up signal is to be concurrently transmitted with the second set of data based on the second interference indicator value.

14. The arrangement of claim 10, wherein the controller is further adapted to cause, if it is not decided that the wake-up signal is to be concurrently transmitted with any set of data, decision of that the wake-up signal is to be transmitted non-concurrently.

15. The arrangement of claim 10, wherein the level of interference caused by the first set of data to the wake-up signal due to concurrent transmission is dependent on one of more parameters associated with concurrent transmission, said one or more parameters comprising at least one of:

a modulation order of the first set of data, a size of an inverse fast Fourier transform applied to the first set of data, a number of sub-carriers used by the wake-up signal, and a transmission power ratio between the wake-up signal and the first set of data.

16. The arrangement of claim 10, wherein the controller is further adapted to cause determination of the first interference indicator value by calculation of an error vector magnitude of concurrent transmission of the wake-up signal with the first data set.

17. The arrangement of claim 10, wherein the controller is further adapted to cause determination of the first interference indicator value is by:

performance of table look-up based on one or more characteristics of concurrent transmission of the wake-up signal with the first data set to acquire score values corresponding to the one or more characteristics; and accumulation of the acquired score values.

18. A wireless communication node comprising the arrangement according claim 10.

* * * * *